H. H. MATHIS.
EDUCATIONAL APPARATUS.
APPLICATION FILED FEB. 18, 1920.
1,370,826.
Patented Mar. 8, 1921.
2 SHEETS—SHEET 1.
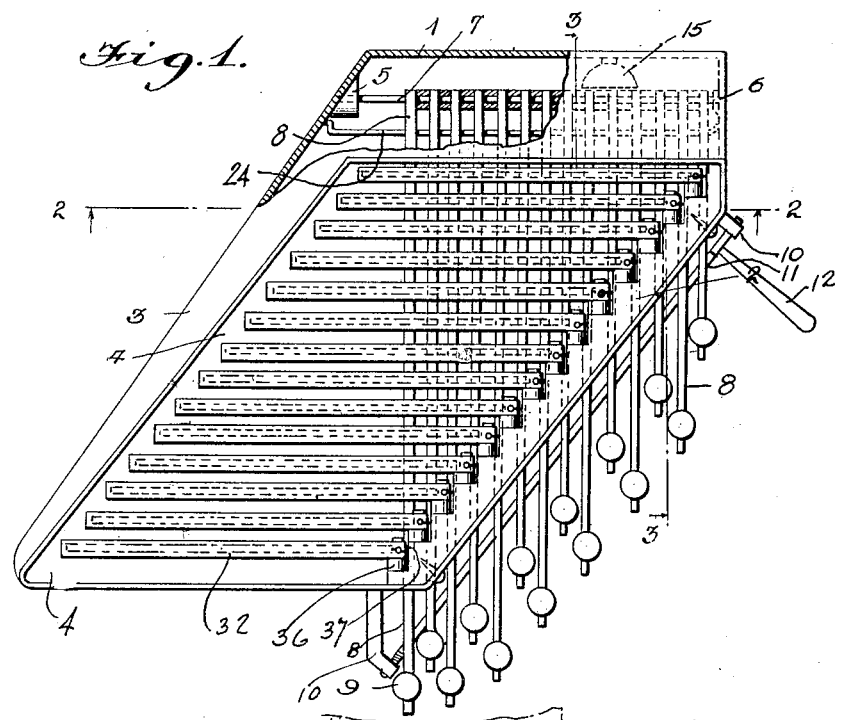
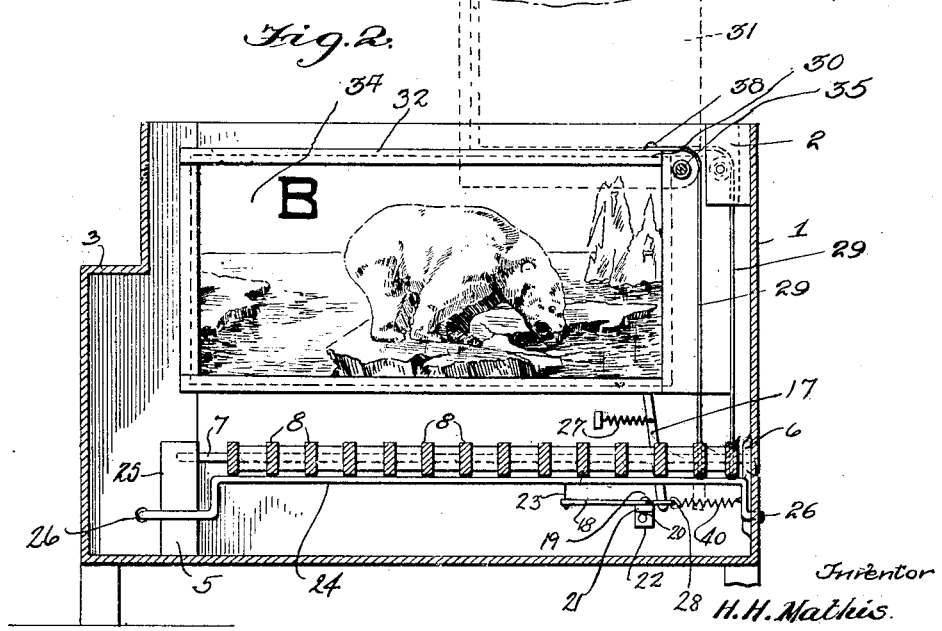

H. H. MATHIS.
EDUCATIONAL APPARATUS.
APPLICATION FILED FEB. 18, 1920.
1,370,826.
Patented Mar. 8, 1921.
2 SHEETS—SHEET 2.
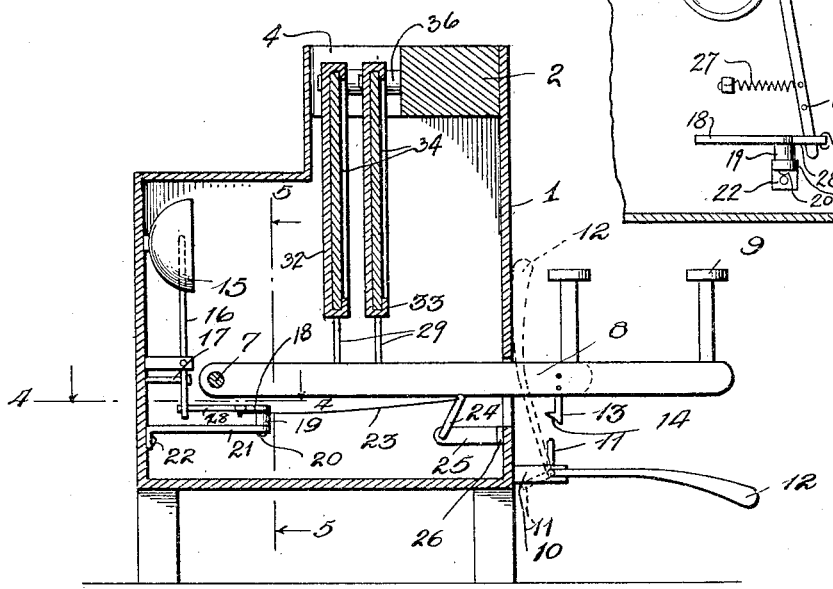
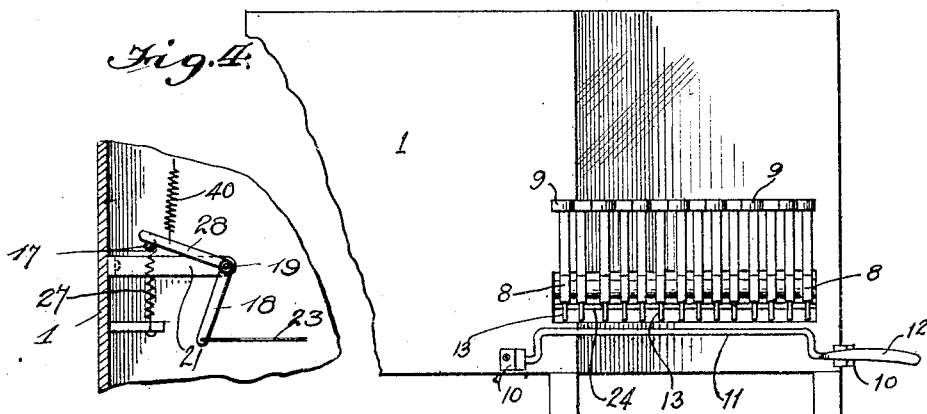
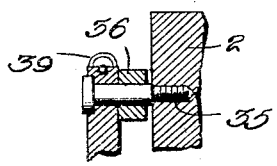
Inventor
H. H. Mathis.
By Lacey & Lacey, his Attorneys

UNITED STATES PATENT OFFICE.

HENRY H. MATHIS, OF NEW HAVEN, CONNECTICUT.

EDUCATIONAL APPARATUS.

1,370,826.   Specification of Letters Patent.   Patented Mar. 8, 1921.

Application filed February 18, 1920. Serial No. 359,624.

*To all whom it may concern:*

Be it known that I, HENRY H. MATHIS, citizen of the United States, residing at New Haven, in the county of New Haven and State of Connecticut, have invented certain new and useful Improvements in Educational Apparatus, of which the following is a specification.

This invention relates to an educational apparatus primarily for use in teaching children though the same is capable of other uses. Various educational devices for teaching children the alphabet, names of different objects and the like have been devised with a view to centering the child's interest on the device in such a manner that it will create a vivid impression of the object lesson to be taught thereby and with this same object in mind I have provided an educational apparatus which will exhibit to children an object lesson in such manner that it will vividly impress the same on the mind.

In carrying the invention out one object to be sought is to provide a device of this character which may contain a series of movable changeable exhibit holders so constructed as to be operable from a bank of keys and having audible means which will draw the attention of the pupil to the fact that a new exhibit holder is displayed for view.

A further object is to so construct the device that the same apparatus may be used for teaching a large number of subjects.

In the drawings:

Figure 1 is a plan view of the device partly broken away;

Fig. 2 is an enlarged vertical section on the line 2—2 on Fig. 1;

Fig. 3 is a similar section on the line 3—3 of Fig. 1;

Fig. 4 is a detail section on the line 4—4 of Fig. 3;

Fig. 5 is a fragmentary section on the line 5—5 of Fig. 3;

Fig. 6 is a fragmentary section showing the manner of pivoting the changeable exhibits.

Fig. 7 is a front elevation of the device.

In detail the invention comprises a casing 1 of any suitable form whatsoever receiving a stepped changeable exhibit holder mounting member 2 which is secured to one side of the casing 1, the top of the casing being partly covered, as at 3, but open through its greater extent, as at 4, to permit display of the exhibits. Within the casing 1 and supported in bearings 5 and 6 at the rear of the casing is a shaft 7 for a purpose to be hereinafter described. However, it may be stated at this time that this shaft extends parallel to the changeable exhibit holders to be later set forth. The shaft 7 carries a series of key levers 8 each having a key 9 at its free end. In extensions 10 carried on the face of the casing 1 is mounted a member 11 which is in the form of an inverted U and one end thereof carries a lever 12. Each key lever 8 is provided with a depending hook 13 beveled as at 14 so that if the lever 12 is turned to position the member 11 as shown in full lines in Fig. 3, any key lever 8, on depression of its key 9 will have its hook 13 engaged under the member 11 and will be held depressed until such time as the lever 12 is raised to the dotted position shown in Fig. 3. On the inside of the case 1 is mounted a bell 15 which is arranged to be struck by a hammer 16 carried on a lever pivoted as at 17 with the lower end of the same engaging a pivoted member 18 carried on a pivot 19 mounted by screw 20 on an extension 21 supported on the side of the case as at 22. One end of this lever 18 connects with a member 23 which in turn connects with a detent bar 24 extending beneath the entire series of levers 8 and journaled in the side of the casing as shown at 26. The parts are so arranged that on depression of any one of the key levers 8, the arm 28 of the bell crank lever 18 will draw back the hammer 16 and ride under the lower end of the hammer lever and release the same whereupon the spring 27, secured to said lever and the casing, will draw the hammer sharply against the bell and sound the same. A spring 40 secured to the casing and the arm 28 of the bell crank lever aids in returning the parts to the initial position, the bell crank lever being deformed on its return movement to clear the hammer lever and resume its initial position. Each of the key levers 8 is connected by a cord 29 to the upper corner 30 of a concealed changeable exhibiting member which consists of a frame 32 having ways 33 in which an exhibiting card 34 may be inserted and secured in place by suitable locking means. These changeable exhibiting members are hung at the said corner 30 upon pivot members 35 and abut against washers 36 placed at each step 37 of the stepped member 2 and each cord 29 is connected above the pivot, as shown at 38, with the upper side of the changeable exhibiting member and extends over the corner thereof in a groove provided for the purpose and is guided by the U-shaped member 39. Due to this construction it is obvious that if any one of the key levers 8 is depressed by its respective key 9, the cord 29 or other connection will throw the particular changeable exhibiting member connected therewith into the position shown in dotted lines in Fig. 2 exposing the card contained therein to the full view and, if desired, it may be locked in this position as previously stated by manipulating the lever 12 which carries the member 11 to the full-line position shown in Fig. 3.

It is obvious that any kind of cards may be used in the changeable exhibit holder and it is preferable to form the bank of keys with twenty-six members. Thus, if it is desired to teach children the alphabet, the teacher may select a series of cards having pictures of animals thereon, which, in nomenclature, correspond with the letters of the alphabet, that is to say on the changeable exhibit holder connected with the L key would be placed a leopard with the letter L over it or the name of the animal. On the changeable letter connected with the B key would be a bear and so on throughout the entire twenty-six letters of the alphabet. If desired, the multiplication tables may be shown on the different cards or any other educational data which may be selected for the immediate purpose at hand. It may sometimes be necessary, because of the character of picture cards available, to use a card of such form that it will not be upright when exposed. By swinging such card to an intermediate position and manually holding the key lever controlling it, a sufficient display of the card may be obtained. Such a card is shown in Fig. 2.

Suppose that the animal cards have been selected and it is desired to teach the children the alphabet the teacher may start by depressing the key A which will expose to view the card bearing a picture of an antelope which will distinctly impress upon the child's memory the fact that the letter A is the first letter of the alphabet and that one word in which this letter is included is the word antelope and similarly with all the rest of the letters of the alphabet. If for any reason it is desired to skip about, this may be easily accomplished or, if it is desired to hold the cards in view for any length of time this is accomplished, as previously stated, by moving the lever 12 to the position shown in Fig. 3.

In connection with the operation of the apparatus it is to be especially noted that the changeable exhibit holders are so operated that the return to the concealed position is purely by gravity without any springs or other complex construction. This feature of the invention is of prime importance in that it provides a device which does not easily get out of order and is likewise very simple to repair.

I claim:

1. In an educational apparatus, a series of exhibitors individually movable from a concealed to a display position, means for selectively displaying any one of said exhibitors, and means common to all of the exhibitors for audibly indicating movement of any one of said exhibitors.

2. In an educational apparatus, stepped means mounting a series of exhibitors in parallel relation for movement from a concealed to a display position, a key bank connected with said exhibitors whereby each key is adapted to operate one exhibitor, and means common to all the keys and actuated on the movement of any one key for audibly indicating movement thereof.

3. In an apparatus for the purpose set forth, the combination of a plurality of parallel exhibitors mounted to swing in vertical planes, a plurality of parallel key levers disposed below the exhibitors and in planes intersecting the planes of the exhibitors, each key lever being operatively connected with a single exhibitor whereby the exhibitors may be selectively displayed, a latching member disposed below and common to all the key levers, and means on each key lever to engage said latching member whereby the selective exhibitor will be held in display position.

4. In an apparatus for the purpose set forth, the combination of a plurality of exhibitors, a plurality of key levers operatively connected with the respective exhibitors whereby the exhibitors may be selectively displayed, means for retaining an exhibitor in display position, a bell, a rocking detent disposed below and common to all the key levers, and connections between said detent and the bell whereby upon depression of any key lever the bell will be sounded.

5. In an apparatus for the purpose set forth, the combination of a plurality of exhibitors, a plurality of key levers each operatively connected with one exhibitor whereby the exhibitors may be selectively displayed, an inverted U-shaped latching member mounted below the key levers for rocking movement, means for setting said member, and hooks depending from the key lever to engage said member.

In testimony whereof I affix my signature.

HENRY H. MATHIS. [L. S.]